Patented Mar. 21, 1950

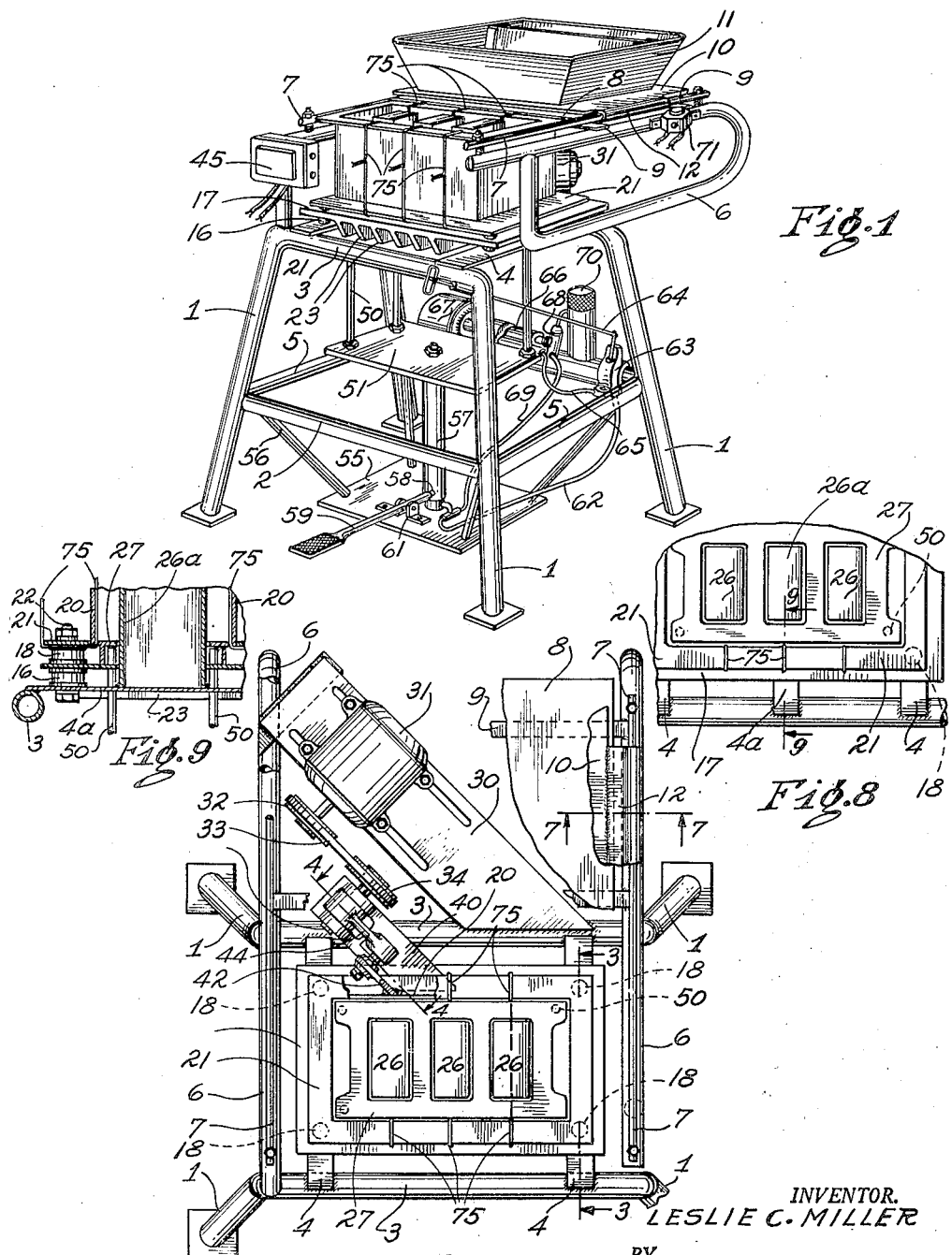

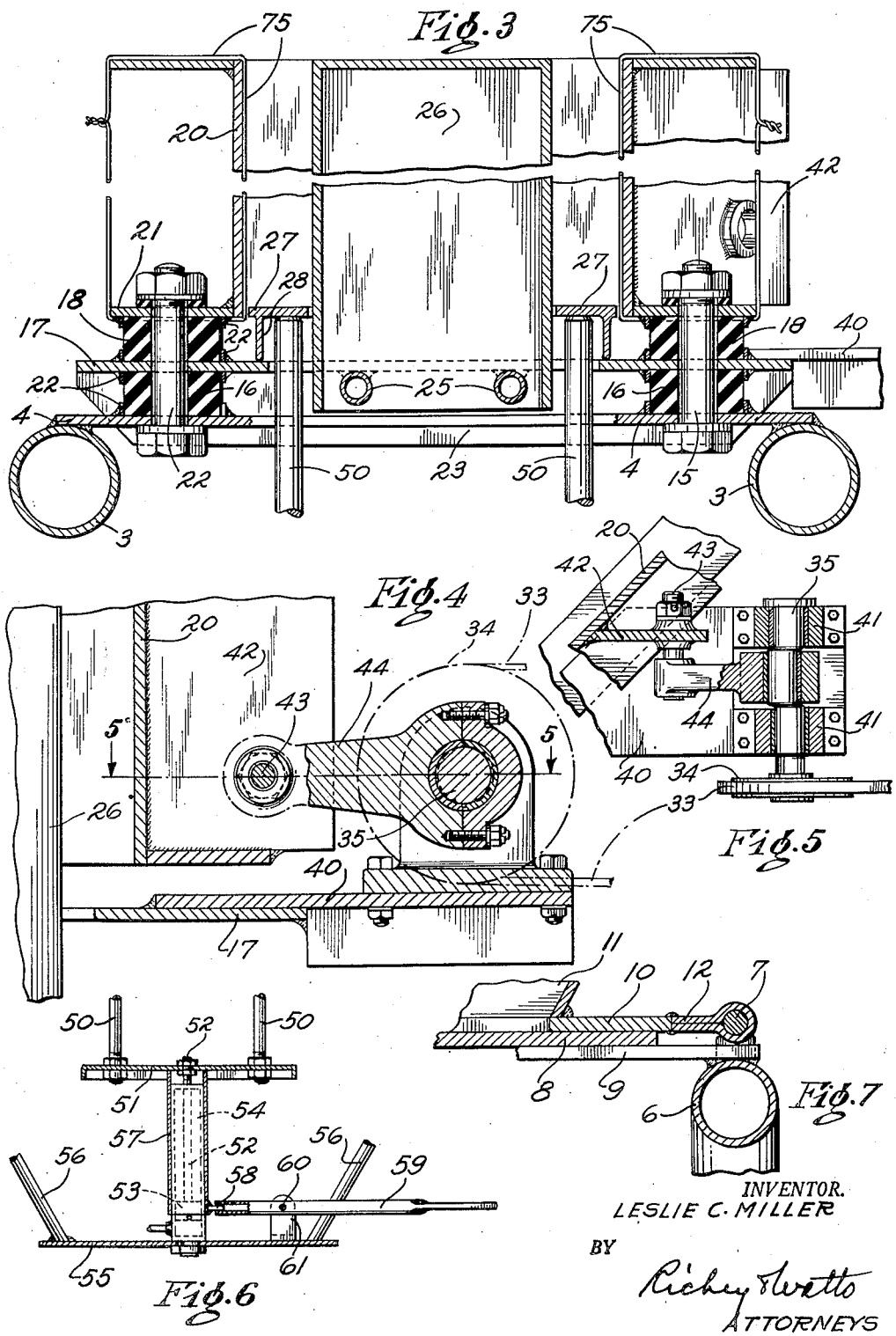

2,501,135

UNITED STATES PATENT OFFICE 2,501,135

MACHINE AND PROCESS FOR MAKING AGGREGATE ARTICLES

Leslie C. Miller, Macedonia, Ohio

Application June 20, 1947, Serial No. 756,062

16 Claims. (Cl. 25—41)

The present invention relates generally to the art of molding aggregate articles and particularly to a new method and new apparatus for agitating and tamping moist aggregate, including cement and slag, cinders or the like, to make such articles.

Some of the present-day machines for molding aggregate articles, including concrete or cinder building blocks, depend upon vertical vibration of the mold and core to compact the moist mixture of solids and to give the resulting articles the desired density.

Articles compacted in this manner decrease in density from the bottom to the top of the mold. Such articles are not satisfactory where uniform density is required. Furthermore, they cannot be removed from their pallets until they have stood for many hours and hence a large investment in expensive pallets is required.

Other present-day machines attempt to avoid the foregoing variable density by exerting pressure on the top of the mixture in the mold during vertical vibration of the mold and core. Such machines require added mechanism including the pressure devices which add to the weight and cost of the machines without corresponding advantages.

The present invention provides a machine which is light in weight and consists of a few parts of simple construction which are inexpensive to make, assemble and maintain, and a method which agitates and tamps the aggregate horizontally between the relatively moving mold and core and produces articles which are substantially uniform in density from bottom to top and which are so strong and well packed that they can be inverted for removal from the pallets as soon as they are removed from the mold.

The present invention will be better understood by those skilled in the art from the drawings which accompany and form a part of this specification and in which, Fig. 1 is a perspective view of one form of apparatus embodying the present invention.

Fig. 2 is a top plan view of the apparatus of Fig. 1 with the hopper and associated parts removed and with certain parts in section.

Fig. 3 is a fragmentary, sectional view with certain parts in elevation taken substantially on line 3—3 of Fig. 2.

Fig. 4 is a fragmentary, vertical, sectional view, partly in elevation, taken on line 4—4 of Fig. 2.

Fig. 5 is a fragmentary, horizontal, sectional view, taken on line 5—5 of Fig. 4.

Fig. 6 is a vertical, sectional view taken thru the ejector cylinder with parts in section.

Fig. 7 is a fragmentary, sectional view taken on line 7—7 of Fig. 2.

Fig. 8 is a fragmentary, top plan view similar to a portion of Fig. 2 but showing a modified form of construction.

Fig. 9 is a fragmentary view on a reduced scale corresponding to Fig. 3 but taken on line 9—9 of Fig. 8.

The apparatus shown in the accompanying figures comprises three main or functional groups of parts, viz: the frame, the block molding mechanism, and the block ejecting mechanism.

The frame, as shown in Figs. 1 and 2, consists of a plurality of tubes and two flat plates. Two of the tubes are of generally inverted U-shape with the legs 1 of the U constituting legs of the frame and being joined together by horizontal cross tubes 2 and with the horizontal parts 3 of the U being substantially horizontal and being connected together by plates 4 on top thereof. The legs 1 of the two U-shaped tubes are connected by horizontal tubes 5 which are generally parallel to plates 4. Two parallel hopper slide brackets 6 are secured to the portion 3 of the U-shaped frame tubes and the plates 4 and hopper slide rods 7 are mounted on these brackets 6. A plate 8 (see Fig. 7) extends substantially from one hopper frame 6 to the other one and is secured thereto adjacent to the rear side of the mold box by straps 9 which are welded to the under side of the plate 8 and to the upper side of frames 6. A feeding hopper is slidable on plate 8 and consists of feed plate 10 and upwardly diverging hopper walls 11. Plate 10 has an opening therethru along the periphery of which the walls 11 are disposed. Straps 12 are attached to opposite sides of plate 10 and slidingly encircle hopper slides 7 so that the hopper may be slid over the top surface of plate 8 and into a position over the mold cavity where a molding mixture in the hopper may be fed from the hopper into the mold cavity.

The molding mechanism comprises a mold box, a core, a core plate, a pallet and means for reciprocating the mold box and core in horizontal plane. These parts are shown in Figs. 1 to 5.

The mold box, core, core plate and pallet are supported by frame plates 4. Rubber blocks 16 are positioned on the top surface of plates 4. The core plate 17 rests on these rubber blocks 16 and carries on its upper surface similar rubber blocks 18. The mold box 20 has an outstanding horizontal flange 21 near its lower edge which rests on the tops of blocks 16. Bolts 22 extend thru plates 4 and 17, flange 21 and blocks 16 and 19. There are four of these assemblages of bolts and rubber blocks and they are located near the corners of the rectangular core plate, as is better shown in Figs. 1 and 2. Each bolt 22 has a small clearance, for example, $\frac{1}{16}$" on each side in the rubber blocks 16 and 19 and in the plates 4 and 17 and flange 19. Each of the blocks 16 and 19 is positioned relative to the plates and flange engaging them by small ribs 23 which are welded to the plates or flanges and constitute sockets for the rubber blocks. It will be understood by reason of the construction just described, the mold box and core plate are resiliently supported and may be moved relatively to a limited extent in horizontal planes.

The core plate 17 is reinforced by depending flanges 23 and the central part is cut away to receive hollow inverted cores 26 which are welded at their sides to adjacent flanges 23. The pallet 27 comprises a plate which is shaped to fit loosely in the mold box 29 and around core 26 which has a depending flange 28 to rest on the core plate, by means of which the pallet is properly positioned in the bottom of the mold box. It will be understood that the clearance between pallet 27 and the mold box and cores is sufficient to permit approximately the same amount of relative movement of box and cores as that permitted by bolts 22.

At the rear of the illustrated molding apparatus and under the hopper a platform 30 is supported on and attached to the rear frame tube 3 and one hopper bracket 6. A motor 31 adjustably mounted on frame 30 carries a pulley 32 on the end of its rotor shaft which is connected by a belt 33 to a pulley 34 mounted on a shaft 35. A bracket 40 projects from the rear side of core plate 18 and carries two aligned bearings 41 in which the shaft 35 is rotatably mounted. An arm 42 projects from the rear side of mold box 29 above bracket 40. A pin 43 is mounted in arm 42. A connecting rod 44 has its small end rotatably mounted on pin 43 and its large end rotatably mounted on shaft 35.

It will be noted that shaft 35 is actually a crankshaft having a small throw, the length of the throw and the resulting length of travel of pin 43 being indicated roughly by Figs. 4 and 5 and being slightly less than the maximum amount of movement permitted by the clearance of bolts 22 in plates 4 and 18 and flange 19.

It will be understood from the foregoing description that when motor 31 rotates pulley 32 and drive shaft 35 thru belt 33 and pulley 34, the mold box 29 may be reciprocated horizontally, assuming that bracket 40 is held in fixed position; or that if mold box 29 is held in fixed position the core plate and core may be reciprocated horizontally. The weight of mold box 29 and arm 42 is substantially the same as the weight of core plate 18, cores 26 and pallet 27 and bracket 40. Since the weights of these two units are substantially the same, the tendency will be for each one to move when shaft 35 is rotated and that is what actually takes place in practice. In other words, the mold parts on the one hand and the core parts on the other hand reciprocate horizontally and relative to each other when shaft 35 is rotated.

It will be noted, by reference particularly to Fig. 2, that the bracket 40 and the arm 42 are disposed at an acute angle to the rear side of the mold body. This angle is such that the bracket and arm lie in planes parallel to planes bisecting the adjacent and diagonally opposite angles of the mold box. By reason of this location of the arm 42 and reciprocation of the arm in its plane one end wall and one side wall of the mold box will exert force on the aggregate mixture in the mold cavity when the mold box moves in one direction and the other pair of walls will similarly exert force against the aggregate when the mold box moves in the opposite direction. The forces applied by each of these walls will be substantially equal because of this angularity and will tamp the aggregate mixture because of the convergence of the walls of each pair of walls. Furthermore, when the core reciprocates it similarly applies forces to the aggregate. Since the mold box and the core parts reciprocate relative to each other, aggregate mixture in the mold box is repeatedly subjected to compacting and tamping forces which are applied by converging walls and which are effective in all sections of the mold cavity except possibly between the cores where the forces may not be fully effective. As a result, the aggregate is tamped and compacted more or less equally from the bottom to the top of the mold cavity, and the smaller solids are forced into spaces between the larger solids so that an extremely dense block is obtained.

It has been found in actual practice that concrete aggregate blocks made by this invention are much denser and stronger than the best blocks that can be made by commercial molding apparatus with which I am familiar. As illustrative of these improved results I give the following test results: Blocks measuring 8" x 8" x 16" and having three cavities, as would result from being made in a mold cavity like that shown in Fig. 2, were made using an aggregate mixture consisting of five parts of sand and gravel and one part of cement and enough water to make a good moldable mass. When these blocks were made on one of the best present-day molding machines of the prior art, the maximum weight obtainable was from 38 to 40 pounds, but when made in the illustrated machine and by the present method they could be made to weigh as much as 50 pounds. By varying the length of agitating and tamping action, i. e., the reciprocation of the mold and core parts, blocks could be made from that mixture having weights which varied anywhere between 40 to 50 pounds each.

Furthermore, aggregate blocks made by the present invention have a strength which exceeds that of the best present-day comparable blocks with which I am familiar. Such blocks are so strong that they will sustain and support themselves while being turned upside down for removal of the pallet. Indeed, blocks have been made by this invention which were strong enough to stand up under the following severe test: The block and pallet were lifted clear of the mold box and a plate was placed on the top surface of the block. Then enough force was applied to the outer surfaces of the plate and pallet to support the block therebetween while the block was being inverted. The block did not change its shape during that time and even held its shape when the pallet and plate were in vertical position. A significant thing shown by this test is that by the present invention blocks can be made of such strength that the green blocks may be removed immediately from the pallets and transferred to inexpensive plates for curing, thus making it unnecessary to tie up expensive pallets during the block curing periods.

The block ejecting mechanism is shown in Figs. 1, 2 and 6. This mechanism includes a plurality of ejector pins 50 engageable at their upper ends with the under side of pallet 27 and secured at their lower ends to a plate 51 which has a piston rod 52 secured thereto and extending downwardly therebelow and terminating in a piston 53 which is slidable in a hydraulic cylinder 54. This cylinder is supported on a table 55 suspended by arms 56 from legs 1 of the frame. A pipe 57 slidingly surrounds cylinder 54 and has a projecting rod 58 which extends into a foot lever 59 pivoted at 60 to a bracket 61 secured to table 55. Depression of foot lever 59 with resultant upward movement of pipe 57 raises ejector pins 50 into contact with and lifts the pallet and block slightly relative to the mold box and sufficient to break the adherence of the block to the mold box and core.

The lower end of cylinder 54 is connected by piping 62 to a shut-off valve 63 which may be controlled by pull rod 64. This shut-off valve is supplied with fluid under pressure thru line 65 from pump 66 which is actuated by motor 67 controlled by switch 71 and mounted on a horizontal tube 2 of the frame. Cylinder 54 is also connected to a relief valve 68 by piping 69 and the relief valve communicates with a reservoir 70 from which the pump may withdraw fluid for propulsion thru the shut-off valve into the cylinder 54. When adherence between the block and the mold box core has been broken, as by actuation of the pins 50 by depression of foot lever 59, the rod 64 is pulled to open shut-off valve 63 and admit fluid under pressure into the bottom end of cylinder 54, whereupon the ejector pins are pushed upwardly until the pallet 27 is above the top of the mold box. When the pallet with the newly molded block thereon has been removed, the shut-off valve is closed, the switch of motor 67 is opened and the weight of the ejector pins and associated parts moves the piston 53 downwardly onto the cylinder 54 and the piston forces liquid out of the cylinder and into the reservoir 70.

It is frequently necessary, and desirable, to have fractional size blocks, i. e., which are three-quarters, one-half, or one-quarter of the size of a full sized block. Heretofore these part-size blocks have been made in molds made for these different sizes. The cost of these several different sized molds and of replacing a mold of one size with a mold of another size makes these fractional sized blocks unduly expensive. By the present invention this expense has been greatly reduced by making full sized blocks which can be broken readily and accurately into fractional blocks of the desired size after being cured. In Fig. 3 are shown two of a plurality of wires 75 extending vertically along the inner surface of the mold box opposite to the core. Preferably, there are two of these wires opposite the longitudinal center line of each core and each wire is wrapped around the outwardly extending flanges of the mold box and is twisted to retain it in place. These wires may be not more than about 1/8" in diameter and, due to the reciprocating action of the mold box and core, these wires will form vertical grooves in the faces of the molded article which act as lines of weakness where breakage will occur when shock forces are applied to the cured block. By using three sets of wires in a mold having three cores as shown in Fig. 2, it is possible to obtain blocks which are one-quarter, one-half or three-quarter of the full size block. The wires may vary in diameter but when they are 1/8" in diameter they form grooves about 3/8" in width.

The operation of the illustrated and above described apparatus will be readily apparent to those skilled in the art but may be described briefly as follows: With the parts of the apparatus as shown in Fig. 1, an aggregate mixture containing a suitable amount of water is placed in the hopper while it is on plate 8. Then the hopper is slid forwardly and the mixture feeds thru hopper plate 19 into the mold cavity defined by mold box 30, cores 26 and pallet 27. The hopper may then be slid back to the rear of the machine over plate 8 for reloading. Then motor 31 is energized with resultant relative reciprocation of the mold box and the core and the aggregate is thoroughly agitated and tamped between the mold box and core by these reciprocating movements. When the aggregate mixture is heavy, the shaft 35 may be rotated at a low speed of about 1750 R. P. M., but when the aggregate mixture is light and fluffy, a higher speed of rotation, such as about 2600 R. P. M. may be used. Other speeds may be used but should be high enough to agitate and tamp the mixture thoroughly. When the agitating and tamping action has been carried on to a predetermined extent which will give a block of the desired density and strength, the motor 31 may be de-energized. Then motor 67 is energized and the adherence of the block to the mold and core is broken by downward movement of foot lever 59. The hydraulic pressure created when motor 67 is actuated is admitted into cylinder 54 and the block and pallet are moved about the mold cavity. When the block and pallet have been removed, motor 67 is de-energized and a pallet is placed in the mold cavity, whereupon the foregoing operation may be repeated.

Figures 8 and 9 show a modification of the apparatus of Figs. 1 to 7. This modified apparatus is particularly useful when it is desired to agitate and tamp the aggregate between the cores. It has been found to be especially useful in making aggregate articles containing sharp sand, blast furnace slag, or similar materials.

The apparatus of Figs. 8 and 9 is the same as that of Figs. 1 to 7 with the following exceptions: Where Figs. 1 and 2 show two plates 4 on the top of the frame, the modified apparatus shows an additional plate 4a similar to plates 4 but located beneath the center core 26. This central core extends thru an opening in core plate 17 and rests on the top of plate 4a to which it is welded. Since core 26a is so supported, it is fixed in position and core plate 17, mold box 20 and the other cores 26 may move relative to it.

As a result of this construction and the reciprocating and relative movements of mold box 20 and cores 26, aggregate between cores 26 and 26a is compacted after the manner above described in all other parts of the mold cavity.

Sharp sand, blast furnace slag and similar materials, cannot be made into strong aggregate articles by present-day molding apparatus. Apparently the cement does not adhere to the smooth surfaces of such "sharp" materials strongly enough, when the articles are made in conventional machines, to result in articles having the requisite high strengths. However, when aggregates containing such sharp materials are molded in machines of the present invention, and particularly in a machine embodying the features of Figs. 8 and 9, this tendency seems to be overcome. Articles made from such sharp materials in this machine have been found to be strong enough to meet the ordinary strength requirements and specifications of the industry.

Having thus described my invention so that others skilled in the art may be able to understand and practice the same, I state that what I desire to secure by Letters Patent is defined in what is claimed.

What is claimed is:

1. A machine for molding moist aggregate articles comprising a mold having vertical walls defining the sides of a rectangular mold cavity, and means connected to the mold for positively reciprocating it diagonally in a horizontal plane to compact the aggregate against said walls.

2. A machine for molding moist aggregate articles comprising a mold having vertical walls defining the sides of a rectangular mold cavity, a core in said cavity, and means connected to the mold and to the core for positively reciprocating them simultaneously in opposite directions diagonally in a horizontal plane to compact said aggregate against said walls.

3. A machine for molding moist aggregate articles comprising a mold, a fixed core, a movable core on one side of the fixed core and means connected to the mold and the movable core for reciprocating them diagonally in a horizontal plane relative to each other.

4. A machine for molding moist aggregate articles comprising a mold, a fixed core, movable cores disposed on opposite sides of said fixed core, and means connected to the mold and to the movable cores for reciprocating a mold and cores diagonally in a horizontal plane and relative to each other.

5. A machine for molding moist aggregate articles comprising a resiliently supported mold box having vertical walls defining the sides of a rectangular mold cavity, a resiliently supported core unit in said cavity, and means connected to the mold box and core for positively reciprocating them simultaneously in opposite directions in a horizontal plane diagonally of said cavity to compact said aggregate against said walls.

6. A machine for molding moist aggregate articles comprising a frame, a mold box having vertical walls defining the sides of a rectangular mold cavity, a core plate carrying a core disposed vertically in said cavity, resilient means disposed between said frame, plate and box for resiliently supporting said plate and box for limited relative horizontal movement, means projecting at an acute angle from the box and from the core plate, and means operatively connected to said projecting means to reciprocate them simultaneously in opposite directions and thereby to reciprocate the box and core diagonally in a horizontal plane and to compact moist aggregate between the core and side walls of the mold box.

7. A machine for molding moist aggregate articles comprising a frame, a mold box having vertical walls defining the sides of a rectangular mold cavity, an arm projecting from one side of said box in a plane parallel to the plane bisecting the adjacent corner angle of the box, a core plate carrying a core disposed in said mold cavity and having a bracket projecting therefrom adjacent and substantially parallel to said arm, resilient means supporting said box and plate on said frame for limited relative horizontal movement, and means connected to said arm and bracket for positively reciprocating them endwise and in opposite directions relative to each other.

8. A machine for molding moist aggregate articles comprising a mold box, a core plate, cores supported by said plate, a pallet constituting a bottom for said mold box and supported by said core plate, said mold box being substantially equal in weight to the weight of said plate, cores and pallet, and means connected to the mold box and core plate for reciprocating the mold box and core plate diagonally in a horizontal plane relative to each other, said means including a rotatable crankshaft mounted in bearings connected to said mold box and plate.

9. A machine for molding moist aggregate articles comprising a frame, a mold box, a core plate, a core connected to said plate, said mold box and core being supported resiliently by the frame for limited relative horizontal movement, a pallet constituting a bottom for said mold and resting on said plate with sufficient clearance between the pallet, mold box and core to permit such limited relative movement, and means connected to the mold box and core plate for moving them diagonally and horizontally relative to each other.

10. A machine for molding moist aggregate articles comprising a frame, plates attached to said frame, a core fixed in position on one of said plates, a core plate resiliently mounted on certain of said plates and having an aperture thru which the said fixed core extends, cores carried by said core plate adjacent to said fixed core, a pallet constituting a bottom for a mold cavity and surrounding said cores and resting on said core plate, a mold box resiliently supported on certain of said plates and defining a mold cavity in conjunction with said pallet and cores, there being sufficient clearance between the pallet, mold box, core plate and fixed and movable cores to permit limited relative movement of the mold box and the movable cores relative to each other and to the fixed core, and means connected to the mold box and core plate for moving them diagonally and horizontally relative to each other.

11. A machine for molding moist aggregate articles comprising a frame, a mold box, a core plate beneath said box, said box and plate being resiliently supported by said frame for limited movement, cores carried by said core plate and extending up thru the bottom of said box, a pallet resting on said plate and disposed within said box and about said cores to form the bottom of a mold cavity, an arm projecting at an angle from said box, a bracket projecting at a similar angle from said core plate, spaced apart bearings on said bracket, a crankshaft rotatable in said bearings, a connecting rod on the crank portion of said shaft, means connecting said rod to said arm, and means to rotate said shaft.

12. The method of molding moist aggregate articles which comprises the steps of substantially filling the vertical molding cavity in a rectangular mold box with a moist mixture of aggregate materials, and positively reciprocating the mold box in a horizontal plane diagonally of said cavity and thereby agitating and tamping said mixture against the cavity walls.

13. The method of molding moist aggregate articles which comprises the steps of substantially filling the vertical, rectangular mold cavity in a mold box and about cores in said cavity with a moist mixture of aggregate materials, agitating and tamping said mixture thruout substantially all parts of said cavity by positively reciprocating the mold box horizontally in a direction diagonally of said cavity and relative to the cores and simultaneously reciprocating a core horizontally in the opposite direction diagonally of said cavity and relative to another core and to said mold box.

14. The method of molding moist aggregate articles which comprises the steps of substantially filling the vertical, rectangular cavity in a mold box about a core with a moist mixture of aggregate materials, positively reciprocating the mold and core horizontally simultaneously in opposite directions diagonally of said cavity and thereby agitating said mixture.

15. The method of molding moist aggregate articles which comprises the steps of substantially filling the vertical, rectangular cavity in a mold box about a core with a moist mixture of aggregate materials, positively reciprocating the mold and core simultaneously in a horizontal plane in opposite directions and substantially parallel to a plane bisecting a corner angle of said box and thereby agitating said mixture and tamping it against converging walls of the mold.

16. The method of molding moist aggregate articles which comprises the steps of substantially filling the vertical, rectangular cavity in a mold box about a core with a moist mixture of aggregate materials, positively reciprocating the mold and core simultaneously in a horizontal plane in opposite directions substantially diagonally of said cavity at a rate of between about 1700 and about 2600 strokes per minute and thereby agitating said mixture and tamping it against angularly disposed walls of the mold and core.

LESLIE C. MILLER.

REFERENCES CITED

The following references are of record in the file of this patent:

UNITED STATES PATENTS

| Number | Name | Date |
|---|---|---|
| 880,782 | Dunlap | Mar. 3, 1908 |
| 1,823,744 | King | Sept. 15, 1931 |
| 2,231,064 | Fearn | Feb. 11, 1941 |
| 2,301,501 | Appley | Nov. 10, 1942 |
| 2,311,480 | Shugart et al. | Feb. 16, 1943 |